(12) United States Patent
Su

(10) Patent No.: US 7,112,075 B1
(45) Date of Patent: Sep. 26, 2006

(54) DRAWER SIM CARD CONNECTOR

(75) Inventor: Yu-Hung Su, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/350,324

(22) Filed: Feb. 8, 2006

(51) Int. Cl.
*H01R 13/62* (2006.01)

(52) U.S. Cl. ..................... 439/159; 439/630

(58) Field of Classification Search .......... 439/159, 439/630, 631, 377
See application file for complete search history.

(56) References Cited

U.S. PATENT DOCUMENTS

| | | | | |
|---|---|---|---|---|
| 5,655,917 A * | 8/1997 | Kaneshige et al. | ......... | 439/155 |
| 5,775,949 A * | 7/1998 | Bricaud et al. | ......... | 439/630 |
| 5,823,828 A * | 10/1998 | Bricaud et al. | ......... | 439/630 |
| 6,095,868 A * | 8/2000 | Hyland et al. | ......... | 439/630 |
| 6,261,113 B1 * | 7/2001 | Chen | ......... | 439/260 |
| 6,375,482 B1 * | 4/2002 | Fan | ......... | 439/188 |
| 6,561,851 B1 * | 5/2003 | Florescu | ......... | 439/630 |
| 6,568,960 B1 * | 5/2003 | Bricaud et al. | ......... | 439/630 |
| 6,602,096 B1 * | 8/2003 | Kronestedt et al. | ......... | 439/630 |
| 6,695,637 B1 * | 2/2004 | Liu | ......... | 439/377 |
| 6,717,805 B1 * | 4/2004 | Liu et al. | ......... | 361/684 |
| 6,805,570 B1 * | 10/2004 | Lee | ......... | 439/326 |
| 6,805,589 B1 * | 10/2004 | Lee | ......... | 439/630 |
| 6,951,470 B1 * | 10/2005 | Huang | ......... | 439/159 |
| 7,011,537 B1 * | 3/2006 | Wu | ......... | 439/159 |
| 7,056,153 B1 * | 6/2006 | Watanabe et al. | ......... | 439/630 |
| 7,059,911 B1 * | 6/2006 | Uchida et al. | ......... | 439/630 |
| 2002/0160661 A1 * | 10/2002 | Florescu | ......... | 439/630 |
| 2004/0082210 A1 * | 4/2004 | Wallace et al. | ......... | 439/152 |
| 2005/0208815 A1 * | 9/2005 | Tsai | ......... | 439/329 |
| 2005/0239333 A1 * | 10/2005 | Watanabe et al. | ......... | 439/630 |
| 2006/0040560 A1 * | 2/2006 | Uchida et al. | ......... | 439/630 |
| 2006/0089052 A1 * | 4/2006 | Lu et al. | ......... | 439/630 |

* cited by examiner

*Primary Examiner*—Ross Gushi

(57) ABSTRACT

A drawer SIM card connector includes a housing base and a carrier. The housing base includes a bottom wall, a pair of side walls which form a receiving cavity, a pedestal formed on the bottom wall and extending upward into the receiving cavity, and a pair of guiding slots defined between the pedestal and the side walls. The carrier includes a pair of spaced apart sliding boards, a back board and a front board which form an opening in a central portion of the carrier. The carrier is slidably assembled within the receiving cavity of the housing base with the pedestal extending above the carrier through the opening and the sliding board being guided by the guiding slots. When the back board of the carrier is stopped by the pedestal, a further outward moving of the carrier is stopped, thereby preventing the carrier from falling off the connector.

8 Claims, 7 Drawing Sheets

DRAWER SIM CARD CONNECTOR

BACKGROUND OF THE INVENTION

1. Field of the Invention

The present invention relates to a subscriber identity module (SIM) card connector, and more particularly to a drawer-type SIM card connector including a carrier carrying a SIM card sliding in the connector for insertion/extraction the SIM card into/from the connector.

2. The Related Art

A subscriber identity module (SIM) card connector is commonly used in electric devices such as a mobile phone. A SIM card usually includes a terminal module to communicate with the identifying devices. Accordingly, the SIM card connector includes a receiving cavity to receive the SIM card and a plurality of terminals to couple with the terminal module of the SIM card. While the SIM card is inserted into the receiving cavity of the SIM card connector, the terminals of the SIM card connector communicate with the terminal module of the SIM card to achieve the communication between the SIM card connector and the SIM card.

As is well known, a user of the mobile phone often changes his SIM card. The SIM card needs frequently to be extracted/inserted from/into the card connector. So a drawer-type SIM card connector that has a carrier carrying the SIM card slide into or out of the connector has been presented to the public for facilitating changing the SIM card. One such drawer SIM card connector is shown and described in U.S. Pat. No. 6,602,096, issued Aug. 5, 2003. The SIM card connector includes a housing base and a carrier. The housing base defines a pair of sliding channels and a receiving cavity to receive the carrier. The carrier defines a card-cavity to receive the SIM card and a pair of sliding boards respectively slidably engaging with the sliding channels of the housing base. While taking the SIM card out, the carrier is inevitably fully slid out of the housing base as there is no structure between the carrier and the housing base to stop the carrier out in the final slide stage.

However, once come off the connector, the carrier is easy to be lost or damaged, and the insertion of the carrier into the receiving cavity of the housing base again is usually difficult to handle. It causes much inconvenience to the users of the electric devices with such SIM card connector.

SUMMARY OF THE INVENTION

Accordingly, an object of the present invention is to provide a drawer subscriber identity module (SIM) card connector, comprising a housing base, a plurality of terminals and a carrier. The housing base includes a bottom wall, a pair of side walls extending upward from two opposite sides of the bottom wall, a receiving cavity defined between the bottom wall and the side walls, a pedestal formed on the bottom wall and extending upward into the receiving cavity, and a pair of guiding slots defined between the pedestal and the side walls. The terminals are disposed in the pedestal of the housing base. The carrier for carrying a SIM card includes a pair of spaced apart sliding boards, a front board connecting front ends of the sliding boards, and a back board connecting rear ends of the sliding boards. The sliding boards and the front and back boards are configured as a closed loop to define an opening in a central portion of the carrier. The carrier is assembled within the receiving cavity of the housing base with the pedestal extending above the carrier through the opening and the sliding boards being guided by the guiding slots to slide. A rear edge of the back board of the carrier is bent upward to form a pushing tab for pushing the SIM card outward when the carrier is pulled to extract the SIM card. When the back board of the carrier is stopped by the pedestal, a further outward moving of the carrier is stopped, thereby preventing the carrier from falling off the drawer SIM card connector.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
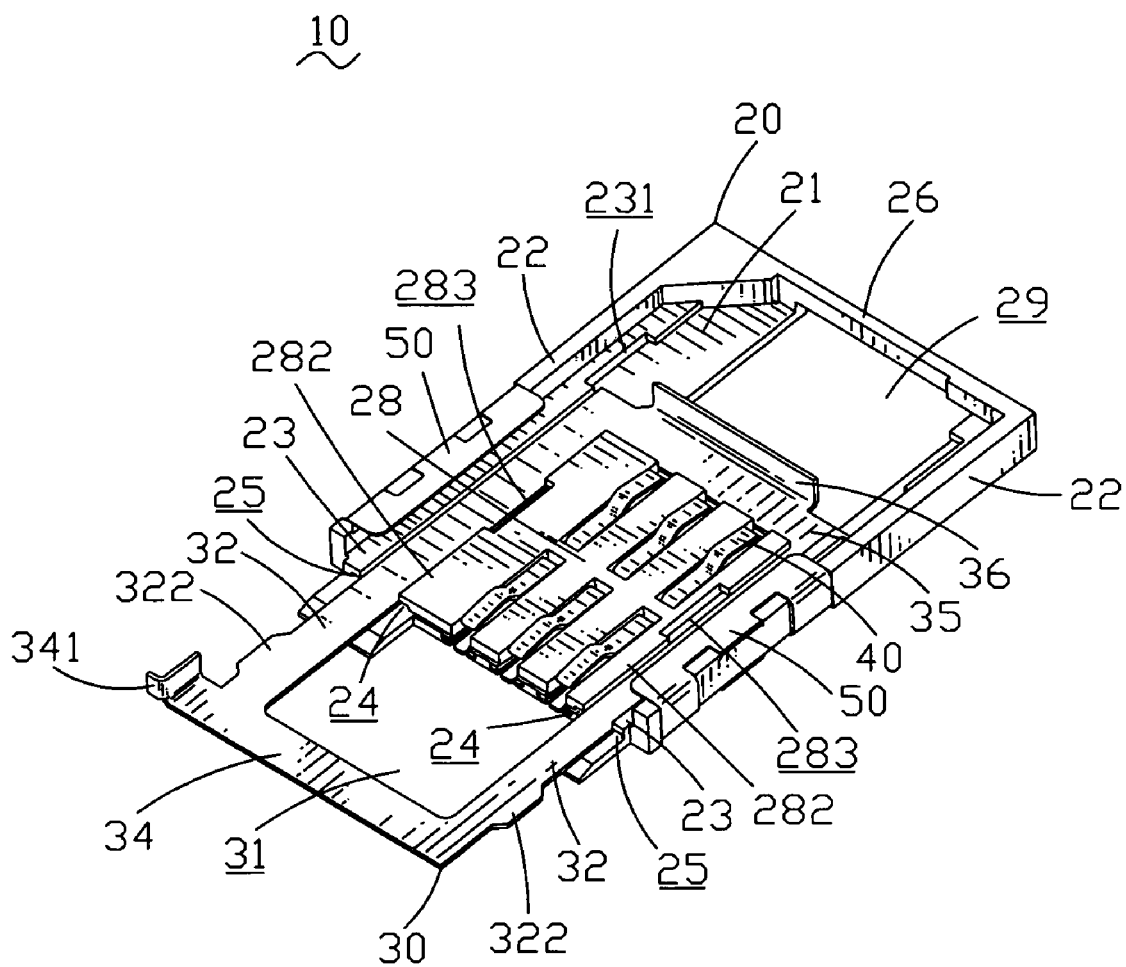
FIG. 1 is a perspective view of a drawer SIM card connector according to the present invention.

Referring to FIG. 1, an embodiment of a drawer subscriber identity module (SIM) card connector 10 constructed in accordance with the present invention is shown. The drawer SIM card connector 10 comprises a housing base 20, a carrier 30, a plurality of terminals 40 and a pair of covers 50.

Figure 3:
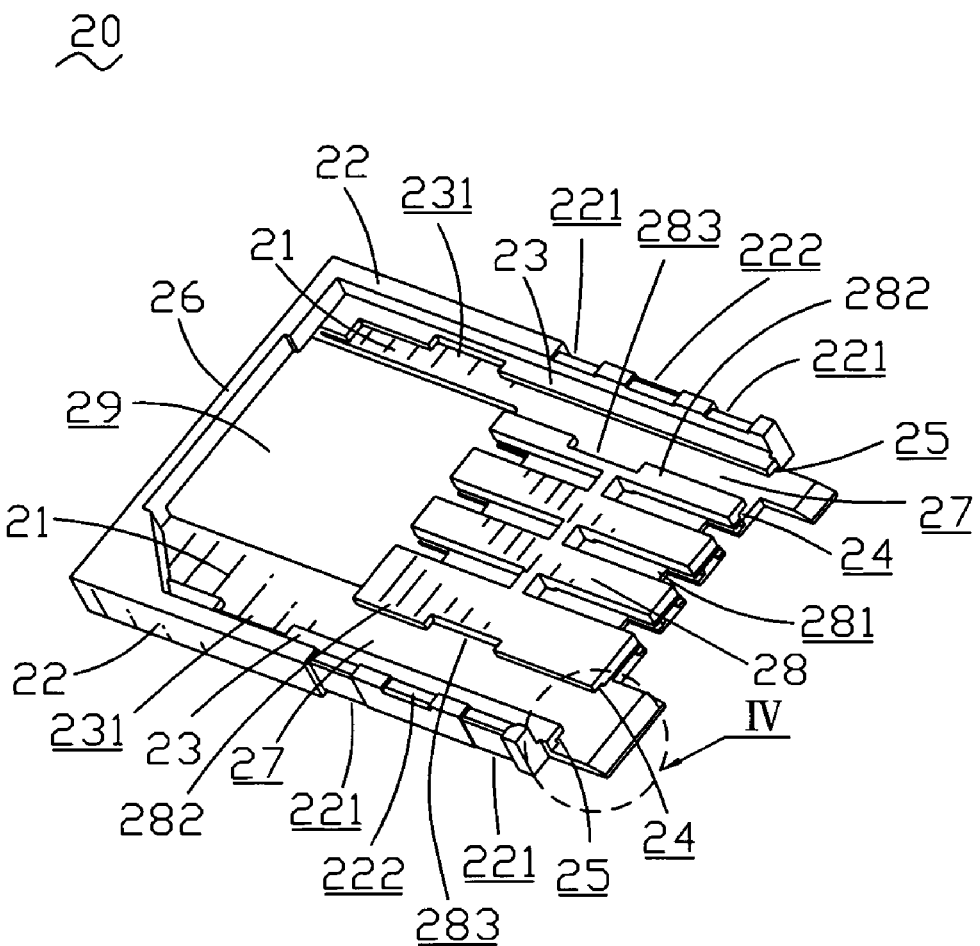
FIG. 3 is a perspective view of a housing base of the drawer SIM card connector.
Figure 4:
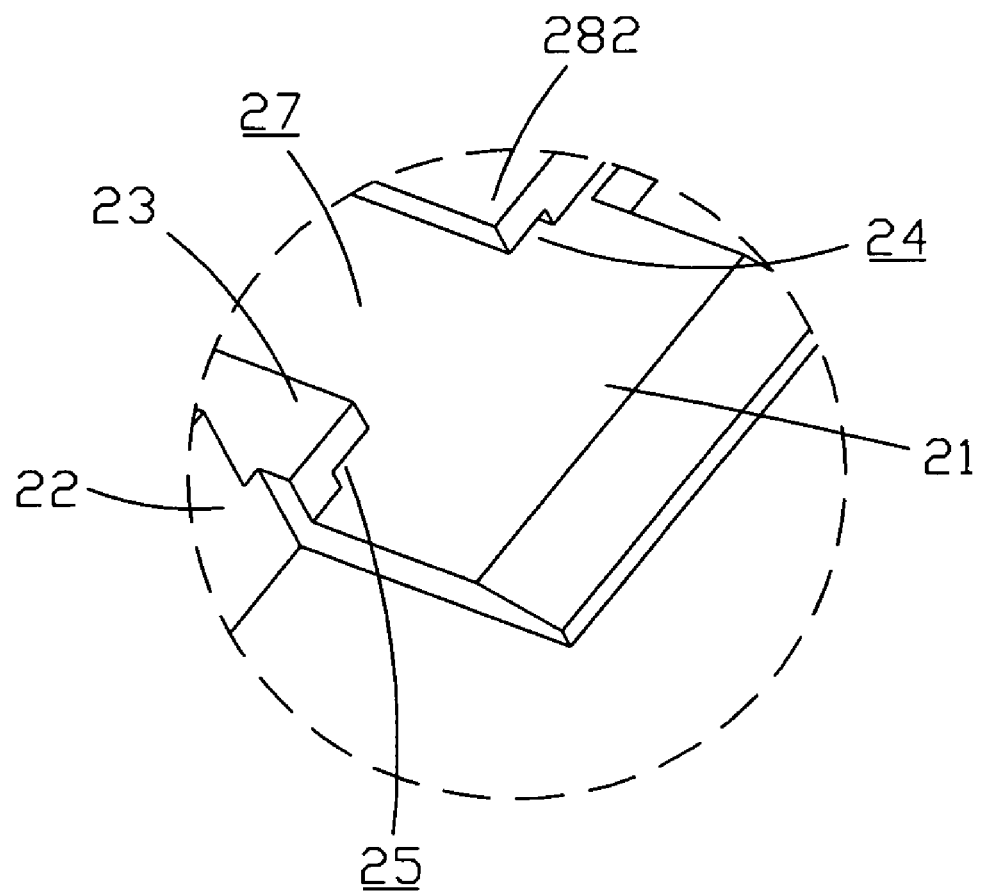
FIG. 4 is an enlarged view of the encircled portion IV of FIG. 3 showing the first and second channels of the housing base in more detail.
Figure 5:
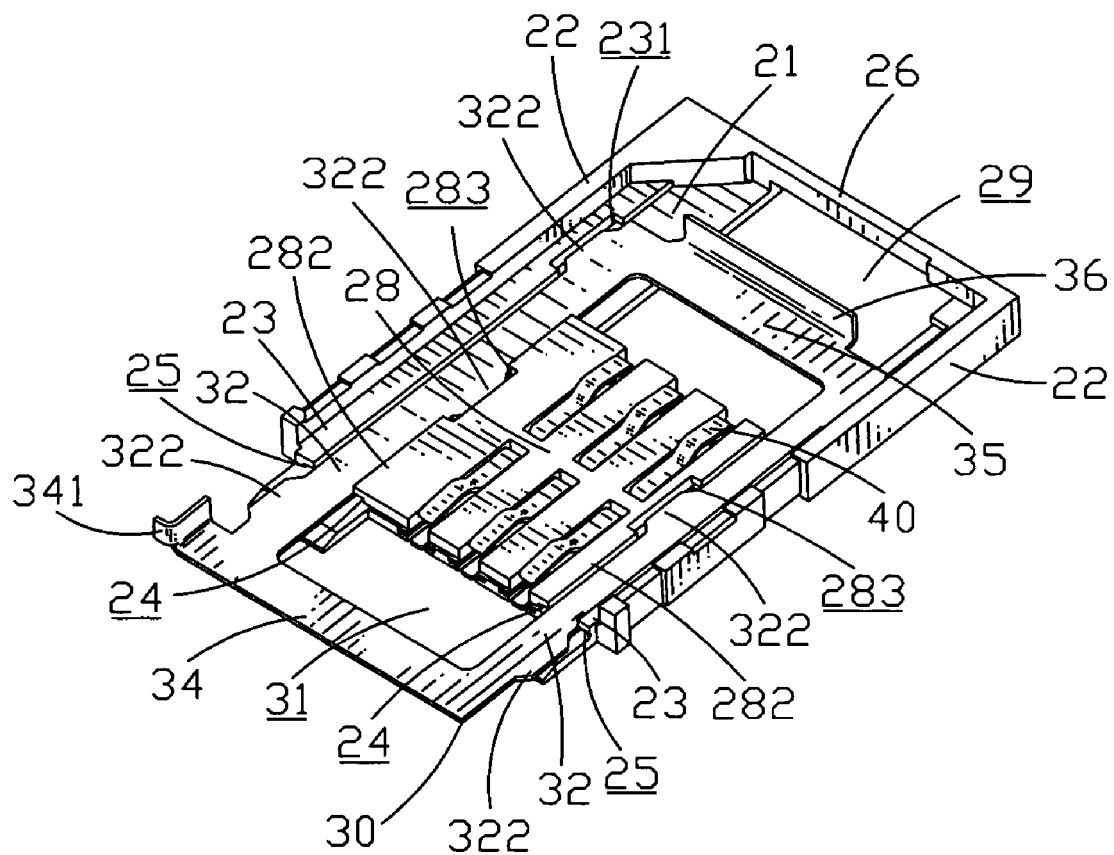
FIG. 5 is a perspective view showing the assembling of a carrier of the drawer SIM card connector with the housing base.

As shown in FIG. 1, the housing base 20 of the drawer SIM card connector 10 comprises a bottom wall 21, a pair of side walls 22 extending upward from two opposite sides of the bottom wall 21 and a stop wall 26 extending upward from a rear edge of the bottom wall 21. The bottom wall 21, the side walls 22 and the stop wall 26 form a receiving cavity 29 to receive a SIM card 60 (as shown in FIG. 5). A pedestal 28 is formed on the front portion of the bottom wall 21 and extends upward into the receiving cavity 29. As shown in FIG. 3, a pair of guiding slots 27 are defined between the pedestal 28 and the side walls 22 of the housing base 20. The pedestal 28 defines a plurality of terminal cavities 281 to respectively receive the terminals 40 and a pair of first platforms 282 extending horizontally into each guiding slot 27. A first channel 24 is formed between each first platform 282 and the bottom wall 21. A first cutout 283 is defined in each first platform 282 and communicates with the first channel 24. Each side wall 22 defines a second platform 23 extending horizontally into the guiding slots 27. A second channel 25 is formed between each second platform 23 and the bottom wall 21. A pair of second cutouts 231 are defined in each second platform 23 and respectively communicate with the second channel 25. As shown in FIG. 3, each side wall 22 forms a pair of first recesses 221 and a second recess 222 in the front portion thereof. The pair of covers 50 is mounted on the side walls 22 respectively by engaging with the first and second recesses 21, 22 and extends horizontally into the receiving cavity 29 as shown in FIG. 1.

Figure 2:
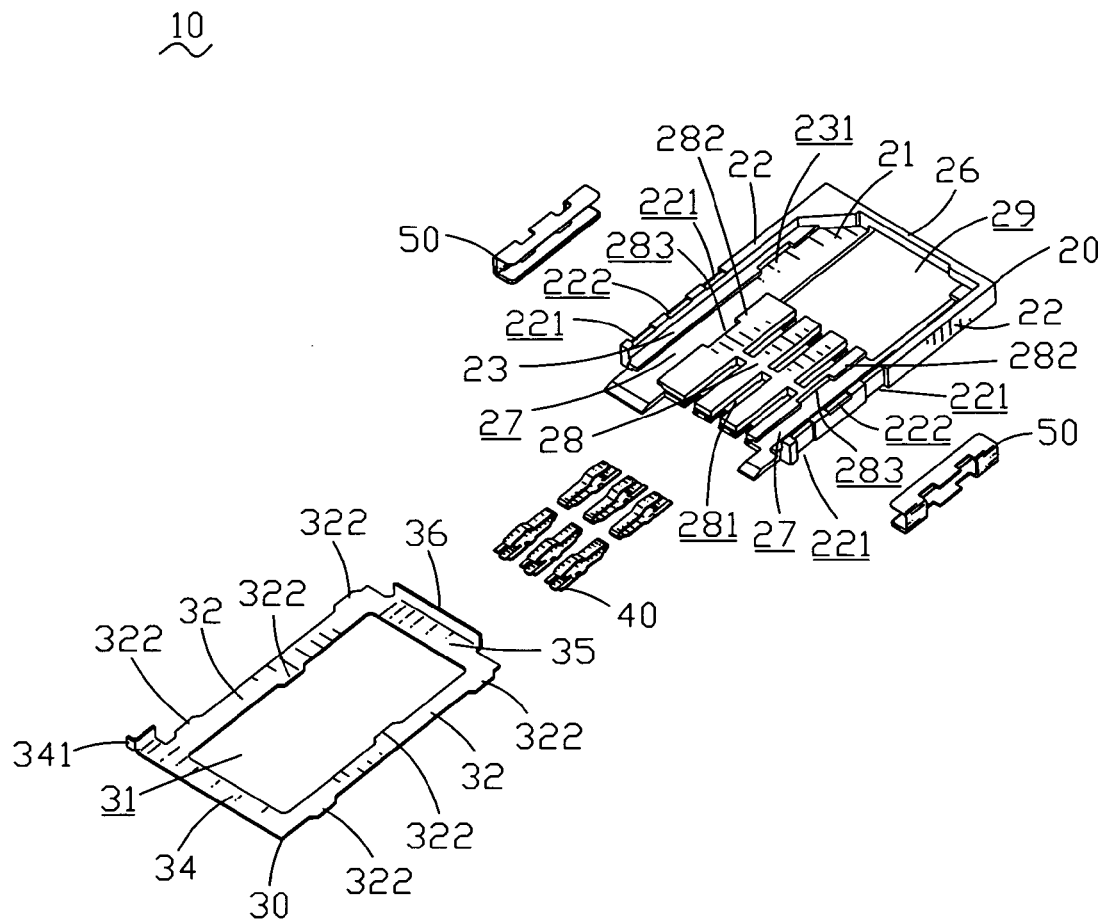
FIG. 2 is an exploded view of the drawer SIM card connector.

Now referring to FIG. 2, the carrier 30 of the drawer SIM card connector 10 for carrying the SIM card 60 includes a pair of spaced apart sliding board 32, a front board 34 connecting front ends of the sliding boards 32, and a back board 35 connecting rear ends of the sliding boards 32. The sliding boards 32, the front board 34 and the back board 35 are configured as a closed loop to define an opening 31 in a central portion of the carrier 30. Each sliding board 32 forms a sliding portion 322 projecting inwardly for slidably engaging within the first channel 24 and a pair of sliding portions 322 projecting outwardly for slidably engaging within the second channel 25. A front end of the front board 34 is bent to form an operating tab 341 for being accessible to push/pull the carrier 20. A rear edge of the back board 35 is bent upward to form a pushing tab 36 for pushing the SIM card 60 outward when the carrier 30 is pulled.

Now referring to FIG. 5, in assembly, the sliding portions 322 of the carrier 30 is firstly aligned with the respective cutouts 231, 283. Then the carrier 30 is placed in the receiving cavity 29 of the housing base 20. Thereafter, the sliding portions 322 come into the first and second channels 24, 25 by sliding the carrier 30 inward or outward as shown in FIG. 1. Thus, the carrier 30 is assembled with the housing base 20. It can be seen that the first cutouts 283 and the second cutouts 231 is designed to allow the sliding portions 322 to come into the first and second channels 24, 25 therethrough, thereby facilitating assembling of the carrier 30. In the assembly, the pedestal 28 of the housing base 20 extends above the carrier 30 through the opening 31, and the sliding boards 32 are guided by the guiding slots 27 to slide.

When pushing the operating tab 341 of the carrier 30, the carrier 30 moves inward along the guiding slots 27 of the housing base 20. When the carrier 30 is fully inserted into the receiving cavity 29 of the housing base 20, the stop wall 26 of the housing base 20 restricts against the pushing tab 36 of the carrier 30 to prevent a further inward moving of the carrier 30. While the operating tab 341 of the carrier 30 is pulled, the carrier 30 moves outward along the guiding slots 27 of the housing base 20. When the carrier 30 moves to a position where the back board 35 run into the pedestal 28, the pedestal 28 stops the back board 35 of the carrier 30 to prevent a further outward moving of the carrier 30.

Figure 6:
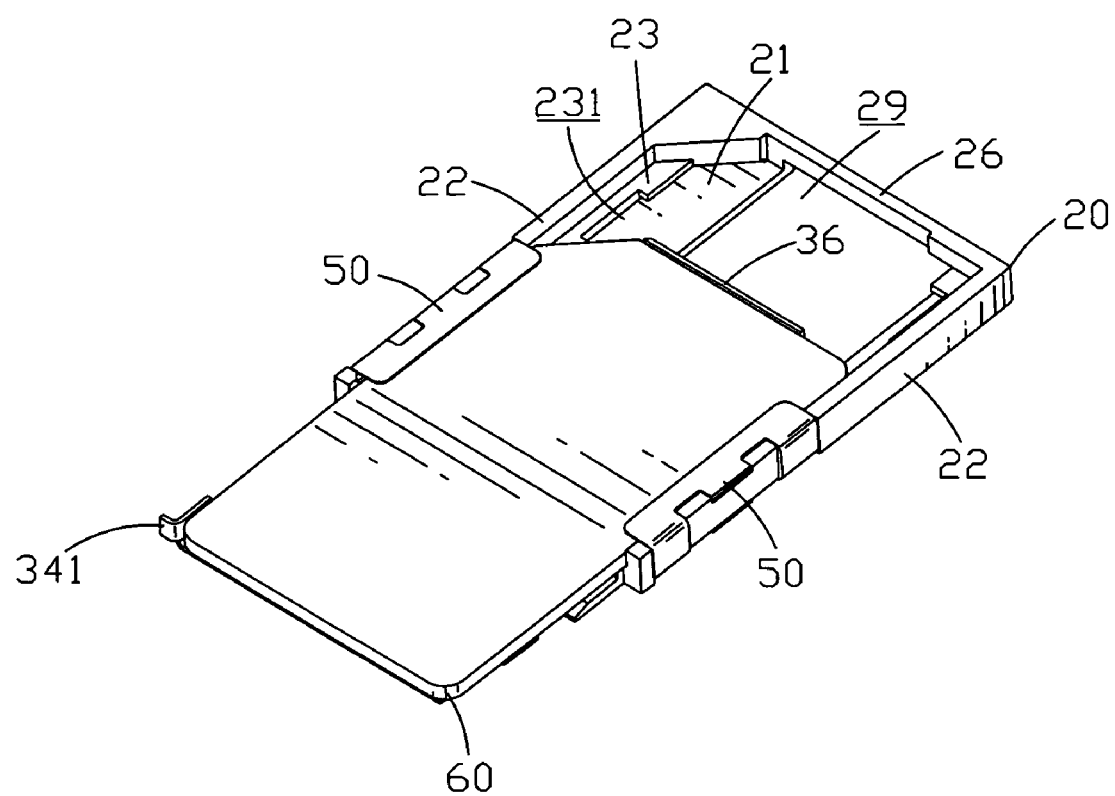
FIG. 6 is a perspective view of the drawer SIM card connector showing a SIM card partly inserted into the drawer SIM card connector.
Figure 7:
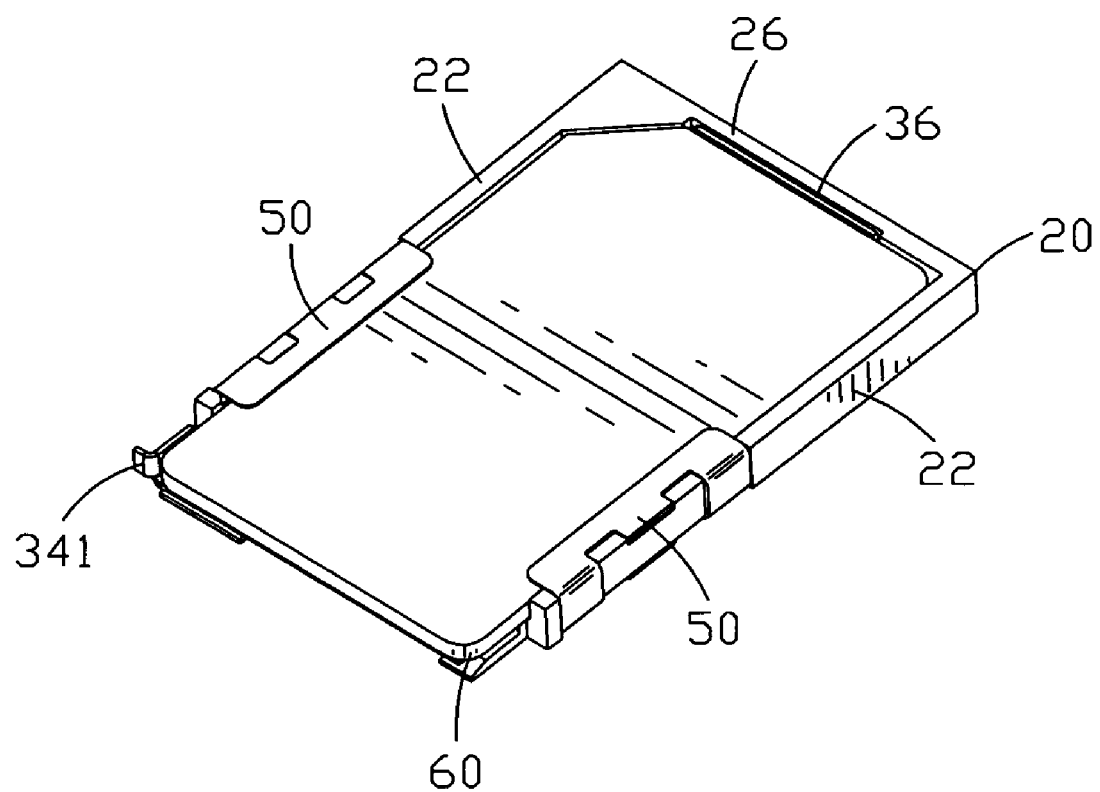
FIG. 7 is a perspective view of the drawer SIM card connector showing a SIM card fully inserted into the drawer SIM card connector.

As shown in FIGS. 6–7, to insert the SIM card 60, the SIM card 60 is placed on the carrier 30, and the operating tab 341 of the carrier 30 and the SIM card 60 is pushed to drive them to slide inward in the receiving cavity 29 of the housing base 20. When the pushing tab 36 of the carrier 30 contacts with the stop wall 26 of the housing base 20, the inward moving of the SIM card 60 and the carrier 30 is stopped. In this state, the SIM card 60 is fully inserted in the connector 10, and the pair of covers 50 tightly press the SIM card 60 to urge the terminals 40 of the drawer SIM card connector 10 to contact with the terminal module (not shown) of the SIM card 60.

Referring to FIGS. 6–7 again, to extract the SIM card 60 from the drawer SIM card connector 10, the operating tab 341 of the carrier 30 is pulled to drive the carrier 30 to move outward along the guiding slots 27 of the housing base 20. Simultaneously, the SIM card 60 is pushed outward by the pushing tab 36 of the carrier 30. When the back board 35 of the carrier 30 contacts with the pedestal 28 of the housing base 20, a further outward moving of the carrier 30 and the SIM card 60 is stopped, thereby preventing the carrier 30 falling off the drawer SIM card connector 10. In this state, the SIM card 60 can be easily taken out from the carrier 30.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A drawer SIM card connector comprising:
   a housing base including a bottom wall, a pair of side walls extending upward from two opposite sides of said bottom wall, a receiving cavity defined between said bottom wall and said side walls, and a pedestal formed on said bottom wall and extending upward into said receiving cavity, a pair of guiding slots being defined between said pedestal and said side walls;
   a plurality of terminals disposed in said pedestal of said housing base; and
   a carrier for carrying a SIM card including a pair of spaced apart sliding boards, a front board connecting front ends of said sliding boards, and a back board connecting rear ends of said sliding boards, said sliding boards and said front and back boards being configured as a closed loop to define an opening in a central portion of said carrier, said carrier being assembled within said receiving cavity of said housing base with said pedestal extending above said carrier through said opening and said sliding boards guided by said guiding slots to slide, a rear edge of said back board being bent upward to form a pushing tab for pushing said SIM card outward when the carrier is pulled to extract said SIM card, when said back board of said carrier is stopped by said pedestal, a further outward moving of said carrier being stopped thereby preventing said carrier from falling off said drawer SIM card connector.

2. The drawer SIM card connector as claimed in claim 1, wherein a first platform extends horizontally into said guiding slot from said pedestal to define a first channel between the first platform and the bottom wall, and each sliding board forms at least one sliding portion projecting inwardly for slidably engaging within the first channel.

3. The drawer SIM card connector as claimed in claim 2, wherein said first platform defines at least one cutout to allow said sliding portion to come into said first channel therethrough.

4. The drawer SIM card connector as claimed in claim 1, wherein a second platform extends horizontally into the guiding slot from each side wall to define a second channel between the second platform and the bottom wall, and each sliding board forms at least one sliding portion projecting outwardly for slidably engaging within the second channel.

5. The drawer SIM card connector as claimed in claim 4, wherein said second platform defines at least one cutout to allow said sliding portion to come into said second channel therethrough.

6. The drawer SIM card connector as claimed in claim 1, further comprising a pair of covers respectively mounted on the pair of side walls and extending into said receiving cavity for pressing tightly the SIM card in the connector.

7. The drawer SIM card connector as claimed in claim 1, wherein one end of said front board is bent to form an operating tab for being accessible to push/pull said carrier together with said SIM card.

8. The drawer SIM card connector as claimed in claim 1, wherein said housing base further includes a stop wall connecting rear ends of said side walls for stopping said carrier further inward movement when said pushing tab is stopped by the stop wall.

\* \* \* \* \*